(12) United States Patent
Kubota et al.

(10) Patent No.: US 11,703,575 B2
(45) Date of Patent: Jul. 18, 2023

(54) PHOTODETECTOR AND DISTANCE MEASURING DEVICE

(71) Applicants: Kabushiki Kaisha Toshiba, Tokyo (JP); Toshiba Electronic Devices & Storage Corporation, Tokyo (JP)

(72) Inventors: Hiroshi Kubota, Tokyo (JP); Nobu Matsumoto, Ebina Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 373 days.

(21) Appl. No.: 16/923,366

(22) Filed: Jul. 8, 2020

(65) Prior Publication Data

US 2021/0088635 A1  Mar. 25, 2021

(30) Foreign Application Priority Data

Sep. 19, 2019  (JP) .................. 2019-170923

(51) Int. Cl.
*G01S 7/48* (2006.01)
*G01S 7/4863* (2020.01)
*G01S 7/4865* (2020.01)

(52) U.S. Cl.
CPC .......... *G01S 7/4863* (2013.01); *G01S 7/4865* (2013.01)

(58) Field of Classification Search
USPC ...................................................... 356/5.01
See application file for complete search history.

(56) References Cited

U.S. PATENT DOCUMENTS

| 8,008,741 B2 * | 8/2011 | Yamamura ........ H01L 27/14636 257/E31.116 |
| 8,610,231 B2 * | 12/2013 | Yamamura ........ H01L 27/14636 257/E27.129 |
| 9,484,366 B2 * | 11/2016 | Yamamura .............. H01L 27/14 |
| 10,012,534 B2 * | 7/2018 | Andreou .................. G01J 1/44 |
| 10,050,069 B2 * | 8/2018 | Yamamura .......... H01L 27/1446 |

(Continued)

FOREIGN PATENT DOCUMENTS

| JP | 2015-117970 A | 6/2015 |
| JP | 2016-187041 A | 10/2016 |

(Continued)

OTHER PUBLICATIONS

F. Lin et al., "A photon-counting avalanche photodiode array with fully integrated active quenching and recharging circuit," Opto-Ireland 2005, SPIE vol. 5826 (SPIE, Bellingham, WA 2005); pp. 569-579.

(Continued)

*Primary Examiner* — James R Hulka
(74) *Attorney, Agent, or Firm* — Allen & Overy LLP

(57) ABSTRACT

A photodetector includes a plurality of channels each having a plurality of SPAD units, each SPAD unit having an avalanche photodiode. The photodetector is capable of selecting outputting or non-outputting of the channels. The SPAD unit includes: an active quenching circuit which performs active quenching of the avalanche photodiode; and a control circuit which brings the active quenching circuit which corresponds to the channel where non-outputting is selected into an operable state.

18 Claims, 15 Drawing Sheets

(56) References Cited

U.S. PATENT DOCUMENTS

| | | | |
|---|---|---|---|
| 10,396,107 B2 * | 8/2019 | Yamamura | H01L 27/14 |
| 11,275,156 B2 * | 3/2022 | Kubota | H01L 31/02164 |
| 2009/0256223 A1 | 10/2009 | Yamamura et al. | |
| 2011/0227183 A1 | 9/2011 | Yamamura et al. | |
| 2013/0187251 A1 | 7/2013 | Yamamura et al. | |
| 2015/0285625 A1 * | 10/2015 | Deane | G01S 7/4817 348/140 |
| 2017/0033137 A1 | 2/2017 | Yamamura et al. | |
| 2017/0131143 A1 * | 5/2017 | Andreou | H01L 31/035272 |
| 2018/0081040 A1 | 3/2018 | Kubota et al. | |
| 2018/0151758 A1 * | 5/2018 | Morimoto | H01L 31/107 |
| 2018/0164152 A1 * | 6/2018 | Scott | G01C 3/08 |
| 2018/0331134 A1 | 11/2018 | Yamamura et al. | |
| 2018/0341009 A1 * | 11/2018 | Niclass | G01S 7/4817 |
| 2018/0372539 A1 * | 12/2018 | Goden | H01L 27/14641 |
| 2020/0292670 A1 * | 9/2020 | Kubota | H01L 31/107 |
| 2020/0296313 A1 | 9/2020 | Nishino | |

FOREIGN PATENT DOCUMENTS

| | | |
|---|---|---|
| JP | 2016-225453 A | 12/2016 |
| JP | 6285168 B2 | 2/2018 |
| JP | 2018-044923 A | 3/2018 |
| JP | 2018-173379 A | 11/2018 |
| WO | 2016-003451 A1 | 1/2016 |
| WO | 2019-087783 A1 | 5/2019 |

OTHER PUBLICATIONS

Franco Zappa, et al., "An Integrated Active-Quenching Circuit for Single-Photon Avalance Diodes," IEEE Transactions on Instrumentation and Measurement, vol. 49, No. 6, Dec. 2000, pp. 1167-1175.

F. Zappa et al., "Fully Integrated Active-Quenching Circuit for Single-Photon Detection," ESSCIRC 2002, Sep. 24-26, 2002, pp. 355-358.

Richardson, J. et al., "Dynamic Quenching for Single Photon Avalanche Diode Arrays," 2007 International Image Sensor Workshop, pp. 258-260.

* cited by examiner

EXAMPLE OF TWO-
DIMENSIONAL SENSOR WHICH
SELECT OUTPUTTING REGION

EXAMPLE OF ONE-
DIMENSIONAL SENSOR WHICH
SELECT OUTPUTTING REGION

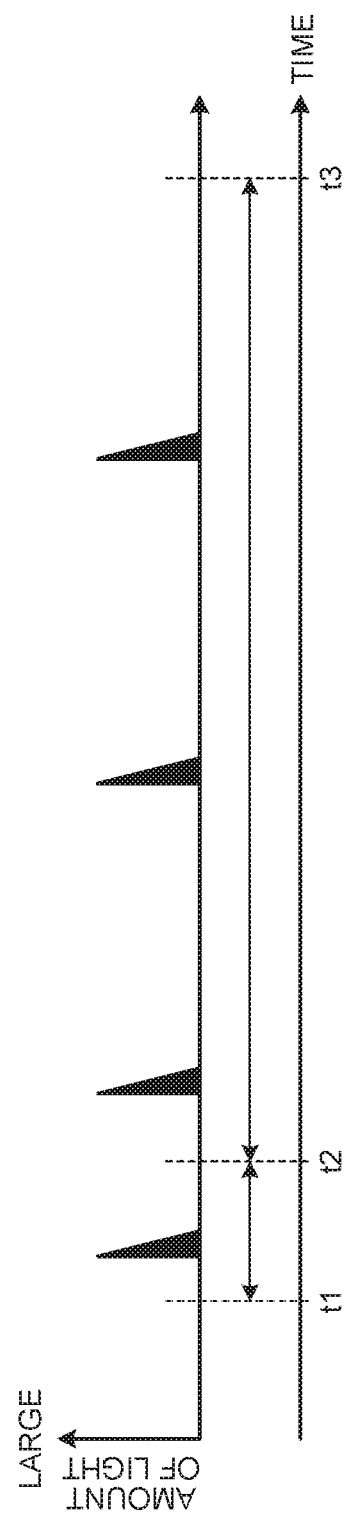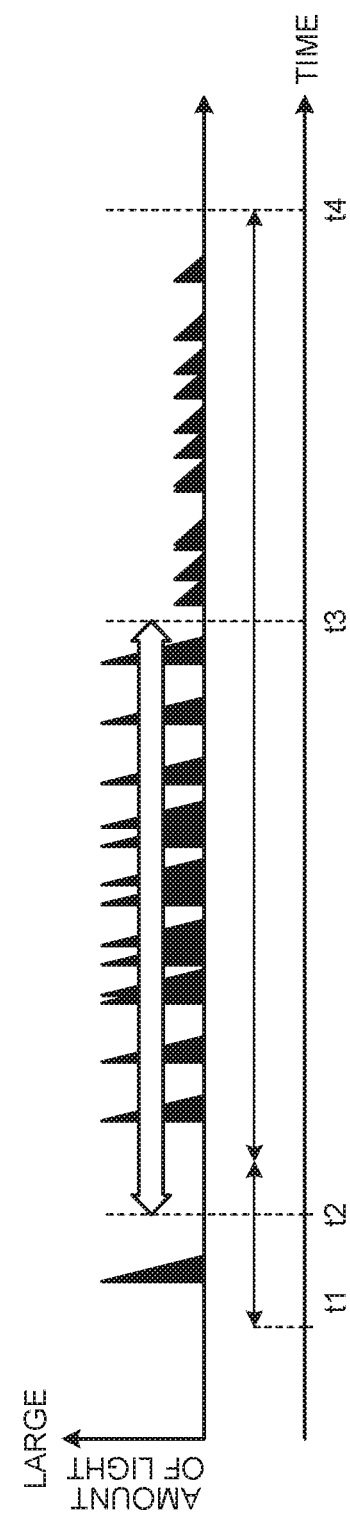

PHOTODETECTOR AND DISTANCE MEASURING DEVICE

CROSS-REFERENCE TO RELATED APPLICATIONS

This application is based upon and claims the benefit of priority from Japanese Application No. 2019-170923, filed on Sep. 19, 2019, the entire contents of which are incorporated herein by reference.

FIELD

Embodiments of the present invention relates generally to a photodetector and a distance measuring device.

BACKGROUND

A light detection and ranging (LiDAR) which is a distance measuring system irradiates a laser beam to an object to be measured, senses an intensity of a reflection light reflected from the object to be measured by a sensor, detects a point of time at which the reflection light reaches the LiDAR, and measures a distance between the LiDAR and the object to be measured based on time difference between the point of time at which the reflection light reaches and a point of time at which the laser beam is irradiated.

This LiDAR technology is expected to be applied to a part mounted on an automobile such as a sensor for automated driving. In the LiDAR which is required to perform a long distance measurement, an optical sensor having high sensitivity is necessary. That is, a photomultiplier which can even detect single photons, particularly, a silicon photo multiplier (hereinafter referred to as SiPM) has been used. At the same time, the LiDAR is also required to have high resolution, and a multi-pixel SiPM which adopts a one-dimensional or two-dimensional array configuration has been proposed (for example, Japanese JP 2016-187041 A or Japanese JP 2018-44923 A).

Although the SiPM has high sensitivity, the SiPM has a drawback that the recovery after detection of light takes time. As a means for alleviating this problem, an active quenching technique which uses an active element has been proposed. For example, see Zappa, et al, "Fully Integrated Active Quenching Circuit for Single Photon Detection", ESSCIRC 2002, or Richardson, J, Henderson, R & Renshaw, D 2007, Dynamic Quenching for Single Photon Avalanche Diode Arrays. In 2007 International Image Sensor See Workshop.

However, in the conventional multi-pixel SiPM, a sensor area is restricted and hence, it is difficult to ensure both high resolution and a dynamic range. Further, the LiDAR is required to be operated various situations such as a bright environment, a dark environment, a high-temperature environment and a low-temperature environment, the LiDAR has various problems in practical use. For example, in a conventional multi-pixel SiPM, a large current flows in a bright environment so that power consumption is increased. Conversely, if an amount of current is restricted, recovery is delayed so that a defect occurs in distance measurement. Furthermore, in an environment where sensor fusion is indispensable, LiDAR also should complement the functions of other sensors and is required to be multifunctional.

An embodiment of the present invention has been made in view of the above-mentioned circumstances, and it is an object of thereof is to provide a LIDAR which uses a multi-pixel SiPM where both high resolution and expansion of a dynamic range can be acquired, and tasks such as the reduction of power consumption can be realized.

BRIEF DESCRIPTION OF THE DRAWINGS

FIG. 16 is an explanatory diagram of the manner of operation of the second embodiment;

DETAILED DESCRIPTION

A photodetector of the embodiment is a photodetector which includes a plurality of channels each having a plurality of SPAD units, each SPAD unit having an avalanche photodiode, the photodetector being capable of selecting outputting or non-outputting of the channels, wherein the SPAD unit includes: an active quenching circuit which performs active quenching of the avalanche photodiode; and a control circuit which brings the active quenching circuit which corresponds to the channel where non-outputting is selected into an operable state.

Next, preferred embodiments will be described with reference to drawings.

Figure 1:
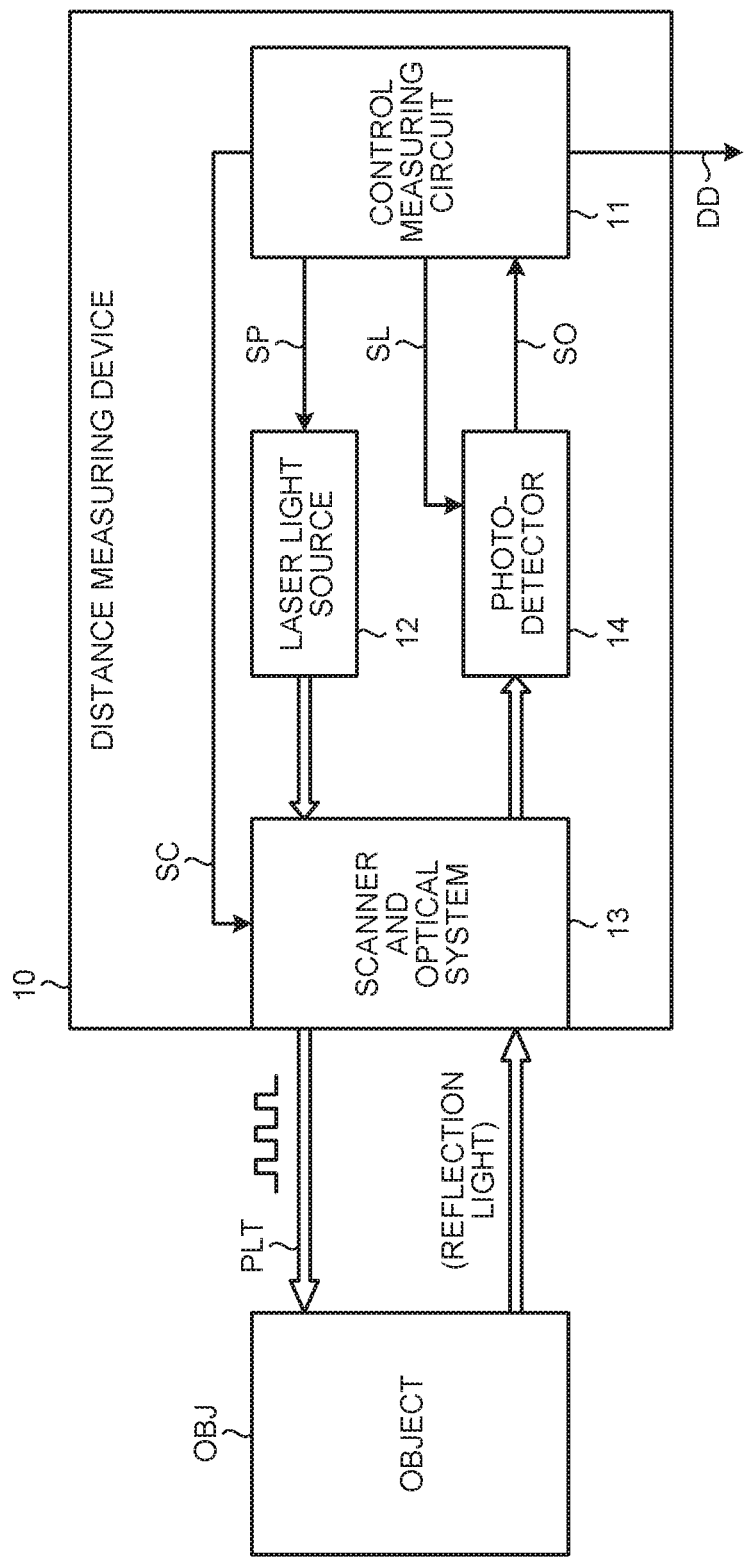
FIG. 1 is a block diagram showing a schematic configuration of a distance measuring device according to an embodiment.

FIG. 1 is a block diagram of a schematic configuration of a distance measuring device according to an embodiment. The distance measuring device 10 according to the embodiment is configured as a LiDAR which measures a distance using a SiPM.

The distance measuring device 10 is configured to be able to measure a distance between the distance measuring device 10 and a distance measuring object OBJ. The distance measuring device 10 is configured as a vehicle mounted LiDAR, for example.

In this case, the distance measuring object OBJ is an object such as another vehicle, a pedestrian, or an obstacle which exists in front of, on sides, or behind a vehicle on which the distance measuring device 10 is mounted, for example.

The distance measuring device 10 includes a control measurement circuit 11, a laser light source 12, a scanner and optical system 13, and a photodetector 14.

The control measurement circuit 11 controls the operation of the entire distance measuring device 10. More specifically, the control measurement circuit 11 sends an oscillation signal SP to the laser light source 12, and controls the emission of a pulsed laser beam PLT by the laser light source 12. Further, the control measurement circuit 11 sends a scanning control signal SC to the scanner and optical system 13 so as to drive the scanner and optical system 13, and controls the scanning direction of a laser irradiated to the object OBJ. The control measurement circuit 11 sends a selection signal SL to the photodetector 14 to select channels (a plurality of SiPMs) which detect a light received by the photodetector 14 (including a reflection light of a pulsed laser beam PLT). Further, when an output signal SO is inputted to the control measurement circuit 11 as a result of detection of a light from the photodetector 14, the control measurement circuit 11 calculates a distance between the distance measuring device 10 and the distance measuring object OBJ based on the output signal SO, and outputs distance data DD which includes the calculated distance.

The laser light source 12 emits a pulsed laser beam PLT (infrared light) having a predetermined pulse width and a predetermined cycle based on an oscillation signal SP from the control measurement circuit 11, and the pulsed laser beam PLT is outputted to the scanner and optical system 13.

Figure 2:
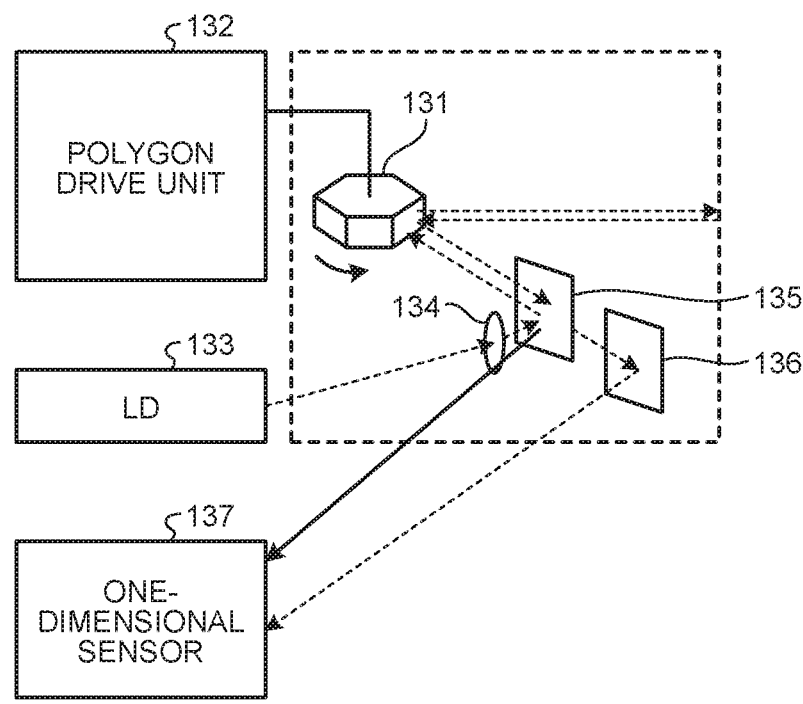
FIG. 2 is an explanatory diagram of a first example of a scanner and optical system.

FIG. 2 is an explanatory diagram of a first example of the scanner and optical system.

In the optical system illustrated in FIG. 2, an optical axis of a projection light and an optical axis of a reflection light coincide with each other by a pinhole (perforated) mirror or the like. Accordingly, the optical system is called a coaxial optical system.

The scanner and optical system 13 illustrated in FIG. 2 includes, for example, a scanner, a light projecting optical system, and a light receiving optical system.

More specifically, in the example of FIG. 2, the scanner and optical system 13 includes: a scanner unit which constitutes a one-dimensional scanning system and includes a polygon mirror 131 where respective mirror surfaces have different tilt angles and a polygon drive unit 132 which rotationally drives the polygon mirror 131; a light projecting optical system which includes a lens 134 which collimates a laser emitted from a laser diode 133, and a pinhole mirror 135 which projects the laser beam collimated by the lens 134 onto a scanning object via the polygon mirror 131; and a light receiving optical system which includes a mirror 136 which receives a laser beam reflected on by the scanning object by way of the polygon mirror 131 and the pinhole mirror 135 and reflects the received light, and a one-dimensional sensor 137 which receives a laser reflected by the mirror 136.

Then, the scanner and optical system 13 drives the scanner based on a scanning control signal SC from the control measurement circuit 11 so that the emission direction of a laser emitted to the outside of the distance measuring device 10 via the light projecting optical system can be changed. More specifically, for example, the scanner and optical system 13 includes a one-dimensional scanning system (capable of performing scanning in the horizontal direction, for example). A laser can be emitted to an entirety of a predetermined two-dimensional range by repeating laser scanning by the one-dimensional scanning system plural times (in directions different from each other little by little with respect to the vertical direction, for example).

Figure 3:
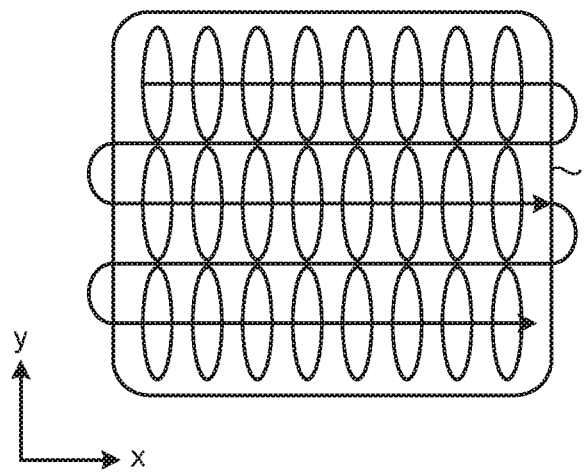
FIG. 3 is a schematic diagram of a laser emission direction in the optical system illustrated in FIG. 2.

FIG. 3 is a schematic diagram of a laser emission direction in the optical system illustrated in FIG. 2.

As illustrated in FIG. 3, the laser scanning is performed in the x direction from one end (a left side in the drawing) to the other end (a right side in the drawing) of a scanning object. When the laser scanning reaches the other end of the scanning object, then, at the position displaced from the above scanning position in the y direction by a predetermined distance, the laser scanning is performed in the x direction from the other end (the right side in the drawing) to one end (the left side in the drawing) of the scanning object. The predetermined two-dimensional range can be scanned by repeating such laser scanning plural times in the same manner.

In this case, the scanner which constitutes the scanner and optical system 13 mirror may be configured such that laser scanning can be performed by rotating a stage (not illustrated in the drawing) on which the light projecting optical system is mounted or laser scanning may be performed by rotating a mirror which constitutes the light projecting optical system.

Further, the light receiving optical system which constitutes the scanner and optical system 13 condenses a received light including a reflection light generated when an emitted pulsed laser beam PLT is reflected by the object 2 (such a received light also including an ambient light and a stray light besides the reflection light) on the photodetector 14. Here, an ambient light and a stray light form a noise.

Although the detailed configuration of the photodetector 14 is described later, when the received light is incident on the photodetector 14 from the scanner and optical system 13, for example, electrons the number of which corresponds to the number of photons included in the reflection light are generated at each cycle of the pulsed laser beam PLT emitted from the laser light source 12. The photodetector 14 is configured to generate, for example, about 100,000 electrons with respect to one detected photon. The photodetector 14 generates an output signal SO corresponding to the number of generated electrons and outputs the output signal SO to the control measurement circuit 11. In the optical system illustrated in FIG. 2, a reflection light is irradiated to basically the same position regardless of the scanning direction. As illustrated in FIG. 3, the projection light has a shape elongated in one direction (for example, the vertical direction), and a one-dimensional sensor which is elongated in one direction is used.

Figure 4:
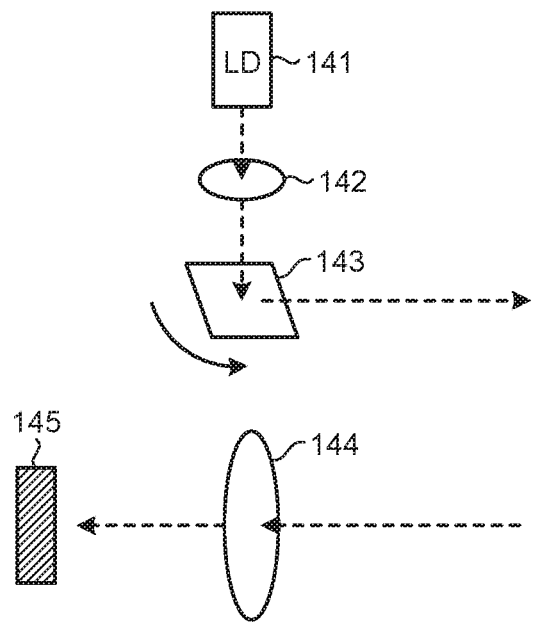
FIG. 4 is an explanatory diagram of a second example of the scanner and optical system.

FIG. 4 is an explanatory diagram of a second example of the scanner and optical system.

The optical system illustrated in FIG. 4 is called a non-coaxial optical system because an optical axis of an emitted light and an optical axis of a reflection light are different from each other.

In the optical system of FIG. 4, a laser emitted from the laser diode 141 is collimated by a lens 142, and the laser is reflected in a desired irradiation direction via, for example, a micro electro mechanical systems (MEMS) 143 which functions as a scanner. As the scanner, a small polygon mirror may be used besides the MEMS.

In the non-coaxial optical system having the above-mentioned configuration, a reflection light is irradiated to different positions in accordance with the scanning directions. Accordingly, the actual sensing position must be changed according to the scanning direction.

Accordingly, when a distance measurement is performed in the two-dimensional direction by a unit such as a two-dimensional scanner, as illustrated in FIG. 4, it is necessary to condense a reflection light from a scanning object by the lens 144 and, thereafter, to selectively receive a light in accordance with scanning by the two-dimensional sensor array 145.

Next, the configuration of the photodetector will be described.

Figure 5:
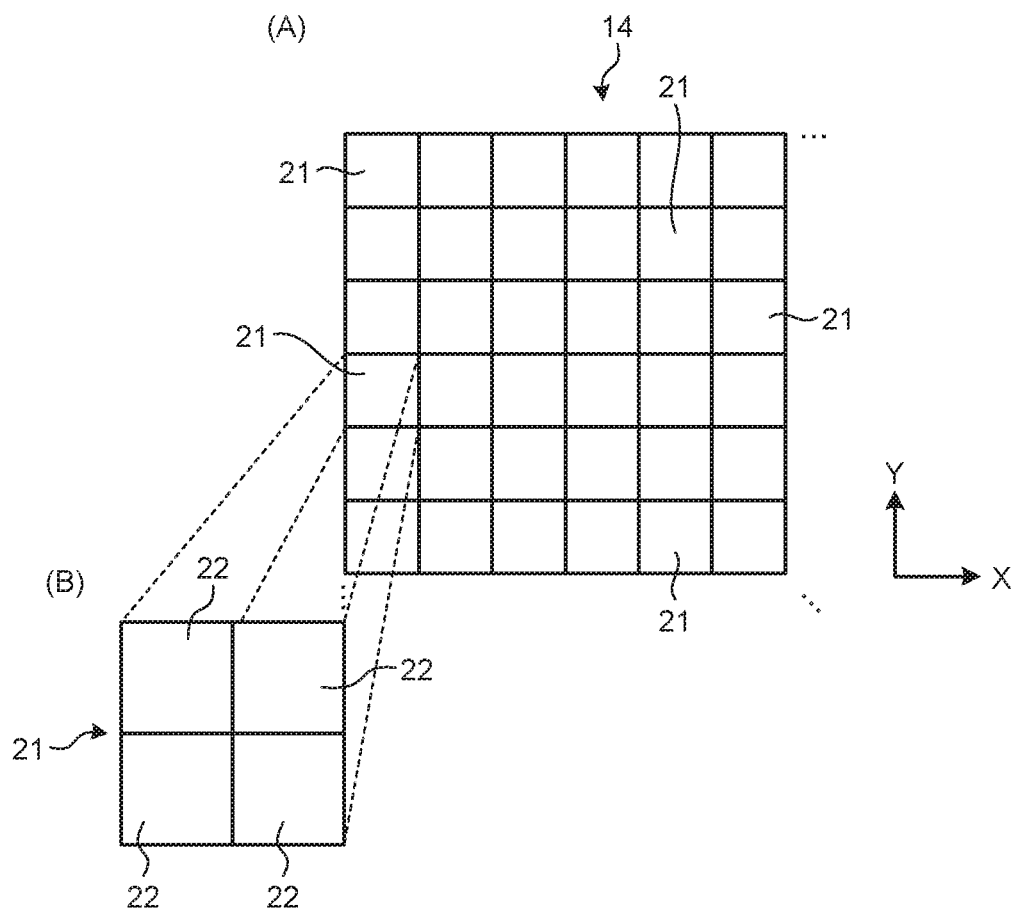
FIG. 5 is an explanatory diagram of a configuration of a photodetector.

FIG. 5 is an explanatory diagram of the configuration of the photodetector.

First, the configuration of the photodetector according to the first embodiment will be described with reference to FIG. 5.

As illustrated in FIG. 5A, the photodetector 14 is configured as a two-dimensional array sensor having a plurality of channels 21 which are arranged two-dimensionally.

As illustrated in FIG. 5B, each channel 21 includes a plurality of (for example, 2×2=4) cell units 22 arranged two-dimensionally. The reason why the number of cell units 22 which form the channel 21 can be small in this manner is that an active quenching is fast so that a dynamic range can be increased due to its high speed property.

Next, a configuration example of another photodetector will be described.

Figure 6:
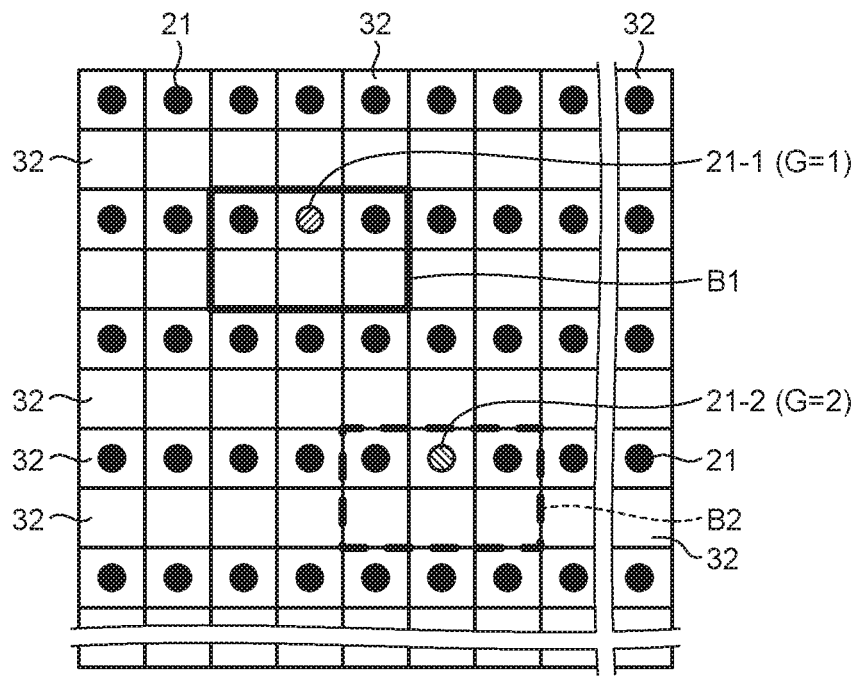
FIG. 6 is an explanatory diagram of a configuration of another photodetector.

FIG. 6 is an explanatory diagram of the configuration of another photodetector.

FIG. 6 is a typical arrangement example of the channels 21 in the two-dimensional array, and black dots represent the channels 21 respectively. Each square frame represents a SPAD unit.

Here, the number of channels 21 and the number of pixels are the same, and six SPAD units 32 correspond to one pixel which corresponds to one channel 21.

That is, when the channel of interest is a channel 21-1 (=pixel G1), the sum of outputs of the six SPAD units surrounded by a bold line frame B1 is used as an output of the pixel G1.

Similarly, when the channel of interest is a channel 21-2 (=pixel G2), the sum of the outputs of the six SPAD units surrounded by a bold line frame B2 is used as an output of the pixel G2.

By adopting such a configuration, it is possible to provide a photodetector having a desired number of pixels (for example, 1000×200 pixels) using a certain number of SPAD units 32.

Figure 7:
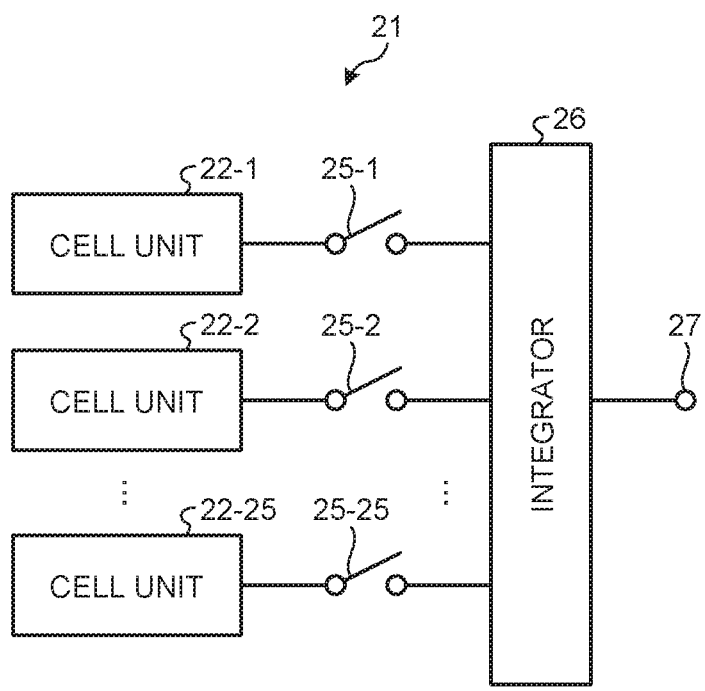
FIG. 7 is a schematic diagram of a channel in a typical one-dimensional array.

FIG. 7 is a schematic diagram of a typical channel in a one-dimensional array.

In FIG. 7, description will be made assuming that each channel 21 includes 25 cell units 22 (cell units 22-1 to 22-25).

In the channel 21, a plurality of cell units 22-1 to 22-25 are connected in parallel, and outputs of the cell units 22-1 to 22-25 are respectively connected to an output terminal 27 via selection switches 25-1 to 25-25 corresponding to the respective cell units 22-1 to 22-25 and an integrator 26. When the sensor is a current output type sensor, for example, the integrator 26 is realized by simply joining output lines to each other.

In the description made hereinafter, when it is not necessary to distinguish the cell units 22-1 to 22-25 from each other, the cell units 22-1 to 22-25 are expressed as the cell units 22.

Accordingly, the output signals of the cell units 22-1 to 22-25 are outputted from the output terminal 27 in an integrated manner.

By the way, not all of the plurality of two-dimensionally arranged channels 21 which form the photodetector 14 perform outputting simultaneously. That is, by designating the position (or the position range) in the first direction (for example, the vertical direction in FIG. 5) and the second direction (for example, the Y direction in FIG. 5) based on a position designation signal, output signals of the channels 21 included in a region having a predetermined shape (a rectangular area, a circular area, an elliptical area or the like) designated based on the position designation signal are separately outputted to a subsequent output stage circuit.

FIG. 8 is an explanatory diagram of an example of a sensor which selects an outputting region.

Figure 8B:
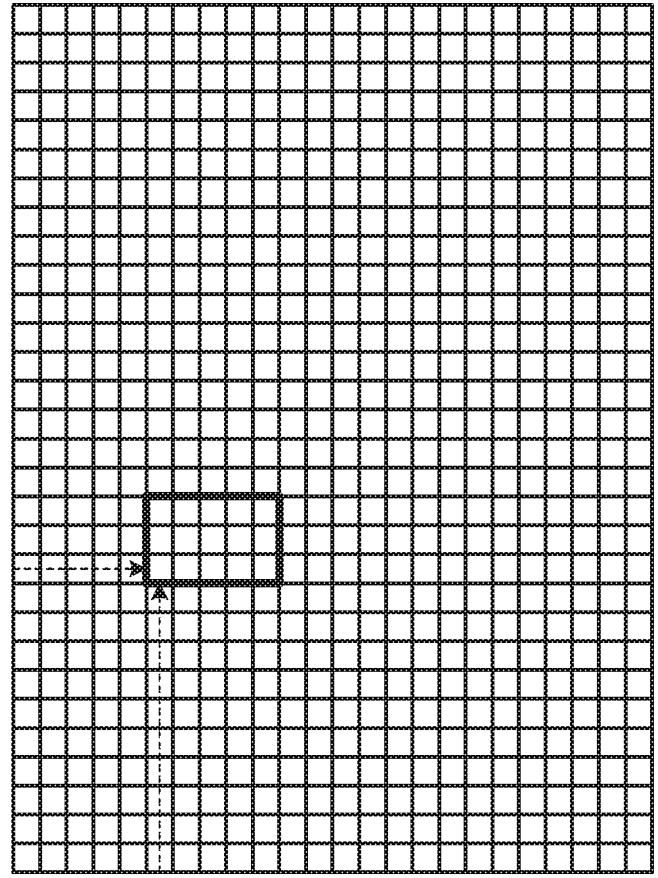
FIG. 8 is an explanatory diagram of an example of a sensor which selects an outputting region.
Figure 8A:
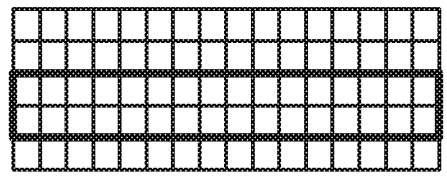

FIG. 8A schematically illustrates the selection of an output region in the one-dimensional sensor. In FIG. 8A, a portion in a bold line frame indicates the selected region.

In general, a one-dimensional sensor is often used with a coaxial optical system, and has an output selection function such that, when the irradiation position is displaced due to individual difference between distance measuring devices, a temperature or aging, the position can be adjusted.

On the other hand, FIG. 8B schematically shows the selection of an output region in a two-dimensional sensor, and a portion in a bold line frame indicates a selected region in FIG. 8B.

In the case of a two-dimensional sensor, the position of the output region is generally selected in accordance with the scanning direction of the light projecting system.

In this embodiment, as described above, the output signals of the channels 21 are outputted separately, and the signals are not outputted after being coupled so that the lowering of S/N can be avoided.

Further, since the outputting from a plurality of channels 21 is used instead of the outputting from one channel 21, no problem occurs even if the synchronization is loose, and the configuration strongly resist against the displacement of the light receiving position.

Further, even when the received light is irradiated across the channels 21, the received light can be detected.

In the case where the respective cell units 22-1 to 22-25 are in a measuring allowable state, regardless of whether or not the measuring is actually performed, even when one photon is incident, a large amount of current generated by the Geiger phenomenon (a current generated by one photon generates a current approximately 100,000 times as large as the current generated by one photon) flows and hence, power consumption is also increased.

In particular, when the photodetector 14 is configured as a two-dimensional array sensor, the number of cell units 22 is enormous and hence, the power consumption becomes very large, and in the worst case, the wiring may be disconnected.

In view of the above, in the embodiment described hereinafter, when the outputting to a subsequent stage is not performed, the power consumption of the cell unit 22 corresponding to a non-outputting portion is suppressed. As a result, the power consumption of the entire photodetector 14 which constitutes a two-dimensional array sensor is suppressed.

Figure 9:
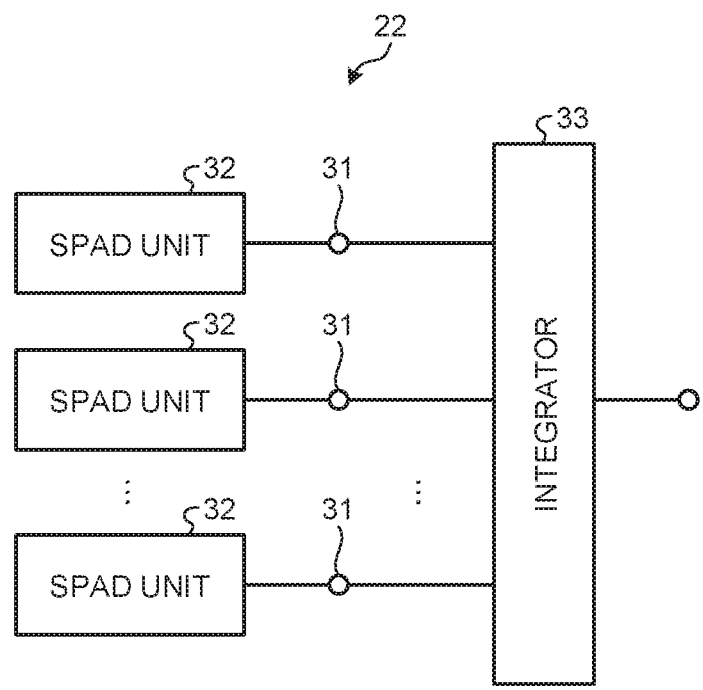
FIG. 9 is a block diagram of a schematic configuration of a cell unit.

FIG. 9 is a block diagram showing a schematic configuration of the cell unit.

The cell unit 22 includes: a plurality of SPAD units 32 which are connected in parallel and each have an output terminal 31; and an integrator 33 which integrates outputs of the SPAD units 32 and output an integrated output.

Next, a specific configuration of the SPAD unit will be described.

First Embodiment

Figure 10:
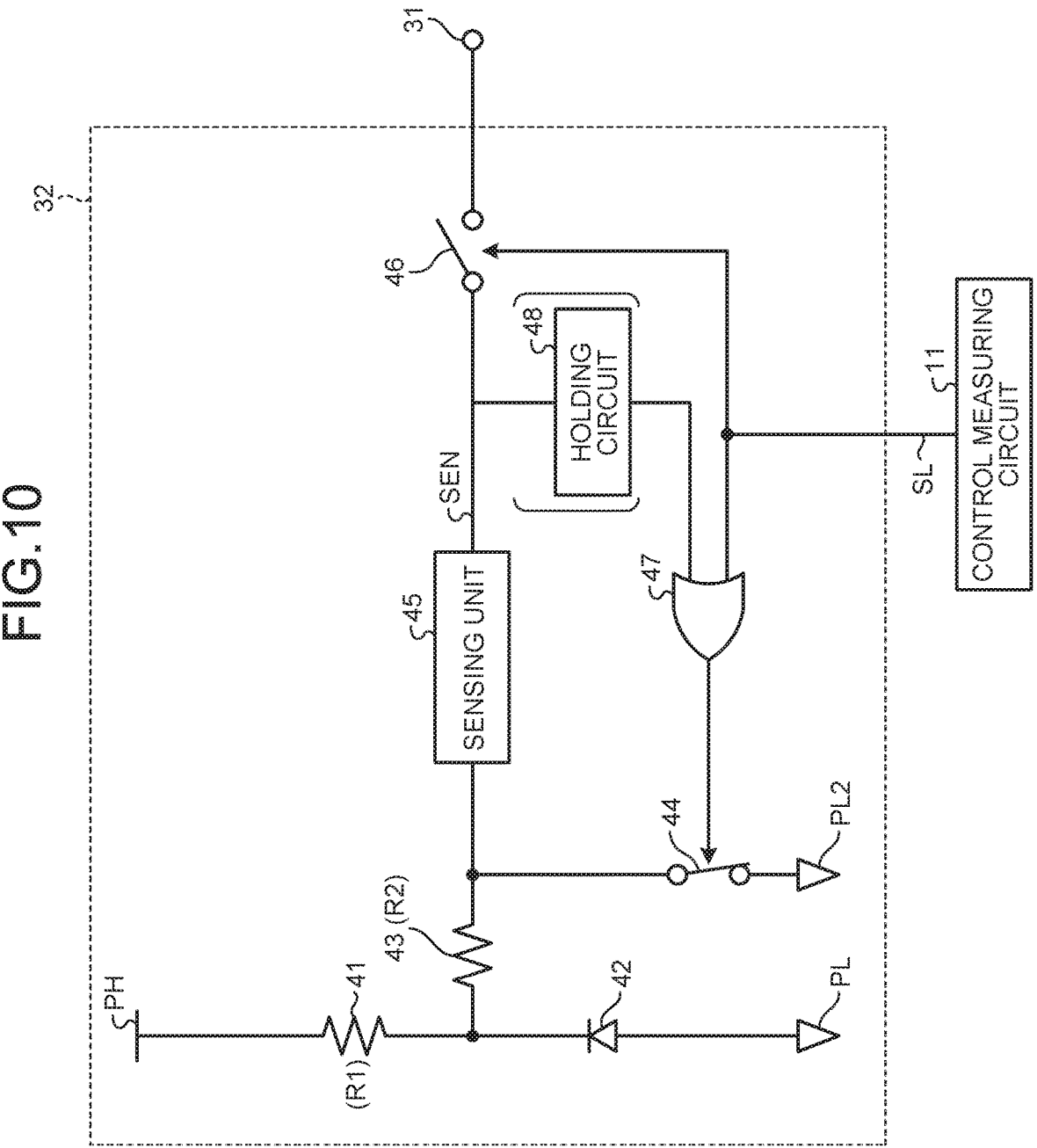
FIG. 10 is a schematic configuration diagram of a SPAD unit according to the first embodiment.

FIG. 10 is a diagram illustrating a schematic function and configuration of a SPAD unit according to the first embodiment.

The SPAD unit 32 includes: a resistor 41 having one end connected to a high-potential side power source PH; a silicon avalanche photo diode (SiAPD) 42 having a cathode connected to the other end of the resistor 41 and an anode connected to a low-potential side power source PL; a current limiting resistor 43 connected in parallel to the SiAPD 42; a quenching switch 44 connected between the current limiting resistor 43 and a second low-potential side power source PL2; a sensing unit 45 configured to detect a change of a potential caused by a Geiger current of the SiAPD 42 and to output a detection signal SEN in an insulated state; a selection switch 46; an OR (logical sum) circuit 47; and a holding circuit 48. The resistor 41 may be substituted by a transistor as described later, and the SPAD unit 32 may not include the resistor 43.

In this embodiment, a potential VPL2 of the second low-potential side power source PL2 is set lower than a voltage described below due to an operating voltage PH, a breakdown voltage Vbd, and an over voltage Vov of the SiPM (this potential setting being also applicable hereinafter). That is, the following relationship is established.

$$VPL2 < PL + Vbd < PH - Vov$$

The quenching switch 44 is realized by a MOS transistor, for example.

In this embodiment, the photodetector 14 controls each SPAD unit 32 based on a selection signal SL outputted from the control measurement circuit 11.

In the above-mentioned configuration, when a Geiger current is detected, a logical value of a detection signal SEN is changed from "0" (for example, "L" level) to "1" (for example, "H" level), and the logical value of a detection signal SEN is held at "1" for a predetermined time by the holding circuit 48.

As a result, during the period in which the logical value of the detection signal SEN is "1", an output of the OR circuit 47 becomes "1".

Accordingly, the quenching switch 44 is always in an ON state (closed state) during the period in which the logical value of the detection signal SEN is "1". When the logical value of the detection signal SEN is set to "0", the quenching switch 44 is brought into an OFF state (open state) during a period in which a detection signal SEN is outputted from the SPAD unit 32 in response to a control signal Cs, and the quenching switch 44 is brought into an ON state (closed state) during a period in which a detection signal SEN is not outputted from the SPAD unit 32 in response to the control signal Cs.

On the other hand, when a detection signal SEN of the SPAD unit 32 is outputted in response to a control signal Cs, the selection switch 46 is brought into an ON state (closed state), and when the detection signal SEN from the SPAD unit 32 is not outputted in response to a control signal Cs, the selection switch 46 is brought into an OFF state (open state).

Further, a resistance value R2 of the current limiting resistor 43 is set to be very small compared to a resistance value R1 of the quenching resistor 41 (R2<<R1).

The manner of operation of the first embodiment will be described hereinafter.

As described above, outputting or non-outputting of an output signal of the channel 21 is selectable. When non-outputting where outputting is not performed via the output terminal 27 (see FIG. 3) is selected, the selection switch 46 of the SPAD unit 32 which constitutes the channel 21 where non-outputting is selected is brought into an OFF state (open state), and the active quenching switch 44 is brought into an ON state (closed state).

As a result, a predetermined reverse bias voltage generated due to a high-potential side power source PH and a low-potential side power source PL is not applied between an anode and a cathode of the SiAPD 42 and hence, the voltage is not biased to a breakdown voltage of avalanche breakdown of the SiAPD 42 (for example, −30 V). Accordingly, a Geiger phenomenon does not occur in the SiAPD 42 even when light enters the SiAPD 42 from the scanner and optical system unit 13, and a Geiger current generated by a Geiger discharge does not flow into the SiAPD 42.

That is, according to the first embodiment, when the outputting of the channel 21 is not selected (during non-outputting), a Geiger current (approximately 100,000 times as large as a normal current) does not flow unnecessarily into the plurality of SiAPDs 42 which form the non-selected channel 21. Accordingly, the lowering of power consumption of the photodetector 14 and, eventually, the lowering of power consumption of the distance measuring device 10 can be realized.

Further, for such a configuration, the active quenching switch 44 for performing active quenching is diverted when the channel 21 is selected and hence, it is possible to suppress an increase of a circuit scale.

In this example, for the sake of brevity, an output of the sensing unit 45 is directly outputted to the output terminal 31, however, the output of the sensing unit 45 may be outputted to the output terminal 31 via an output buffer. In the output buffer, a time for holding "1" may be set different from a holding time which corresponds to the detection signal SEN described above.

[1.1] Modification of First Embodiment

In the case where the number of channels 21 is large, when the SPAD unit 32 does not perform outputting via the output terminal 31, there is a possibility that a through current which flows from a high-potential side power source PH to a low-potential side power source PL via the quenching resistor 41, the current limiting resistor 43, and the active quenching switch 44 brings about considerable power consumption of the entire photodetector 14.

In view of the above, a modification of the first embodiment is provided for suppressing this through current thus suppressing the power consumption of the entire photodetector 14.

Figure 11:
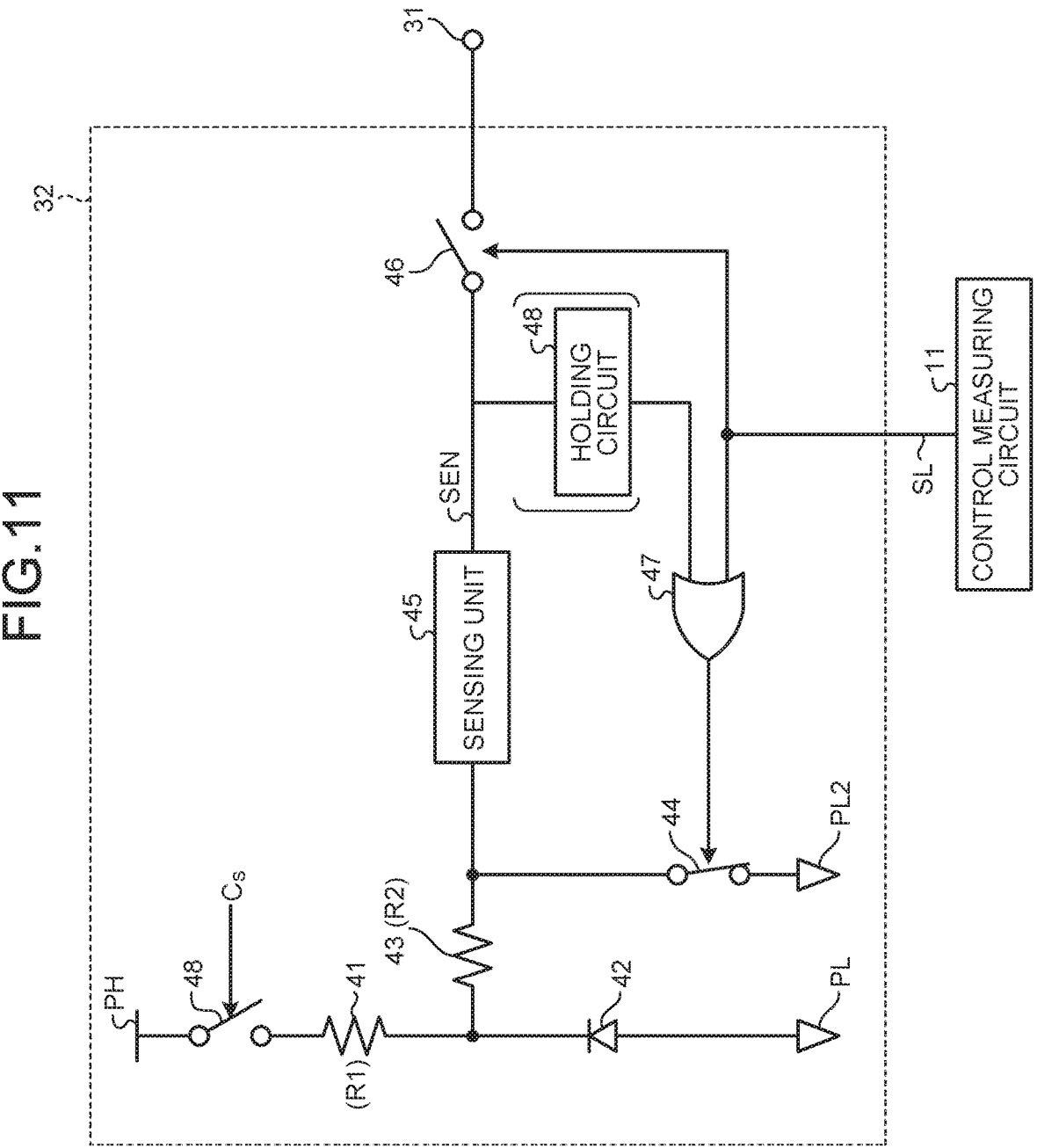
FIG. 11 is a schematic functional configuration diagram of a SPAD unit according to a modification of the first embodiment.

FIG. 11 is a diagram illustrating a schematic functional configuration of a SPAD unit according to the modification of the first embodiment.

In the modification of the first embodiment, as illustrated in FIG. 11, a through-current prevention switch 48 is provided between a resistor 41 and the high-potential side power source PH. Note that the resistor 41 may not be provided.

When the outputting from the channel 21 is not selected (non-outputting time), that is, when the SPAD unit 32 does not perform outputting via an output terminal 31, a selection switch 46 and the through-current prevention switch 48 are brought into an OFF state (open state), and an active quenching switch 44 is brought into an ON state (closed state).

As a result, it becomes possible to prevent a through current flowing from the high-potential side power source PH to the low-potential side power source PL via the resistor 41, the current limiting resistor 43, and the active quenching switch 44. Accordingly, power consumption can be further reduced.

As described above, according to the modification of the first embodiment, with respect to the SPAD units 32 corresponding to the channels 21 in an outputting non-selected time, it is possible to eliminate a Geiger current and hence, it is possible to reduce or eliminate a through current which flows from the high-potential side power source PH to the low-potential side power source PL. Therefore, power consumption can be reduced without affecting the intended distance measurement.

Figure 12:
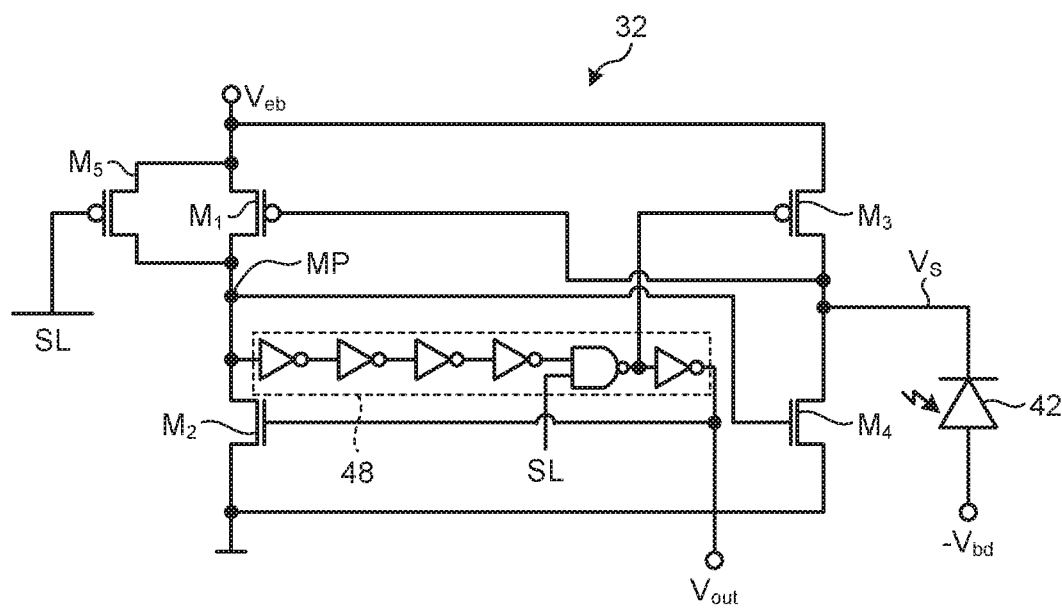
FIG. 12 is an explanatory diagram of an example of circuit configuration of the SPAD unit according to the first embodiment.

FIG. 12 is an explanatory diagram of an example of a circuit configuration of the SPAD unit according to the first embodiment.

FIG. 9 and FIG. 10 described above are provided for functionally describing the SPAD unit 32 of the first embodiment. As an actual circuit configuration of the SPAD unit 32, for example, a configuration illustrated in FIG. 12 is adopted.

In the SPAD unit 32 illustrated in FIG. 12, a transistor M4 corresponds to a quenching switch, and a transistor M3 corresponds to a reset switch which recovers a cathode potential of a SiAPD 42 while preventing a through current.

In order to hold a signal for a predetermined time, four inverters are used as a holding circuit 48 (delay circuit). On the other hand, the holding circuit 48 (delay circuit) is not connected to gate terminals (inputting) of a transistor M1 and the transistor M4 which are required to exhibit a high-speed response in quenching. Accordingly, a quick quenching operation is expected with respect to the transistor M1 and the transistor M4.

Further, a transistor M5 is added compared to a conventional active quenching circuit. Accordingly, when a selection signal SL is "0" (="L" level), a logic value of a connection point MP is fixed to "1" (="H" level) by the transistor M5. As a result, the quenching switch M4 is brought into an ON state (closed state), and the SiAPD 42 is held at a voltage equal to or below a breakdown voltage Vbd. At the same time, a transistor M3 is in an OFF state (open state), there is no possibility that a through current flows.

When a conventional circuit which is not provided with the transistor M5 is used, when a selection signal SL is "0" (="L" level), the transistor M2 and the transistor M3 are always in an OFF state (open state), and the connection point MP is in a floating state. In particular, when the power source is supplied, a plurality of SiAPDs 42 are brought into an ON state at a time and hence, there is a possibility that a large current flows.

Figure 13:
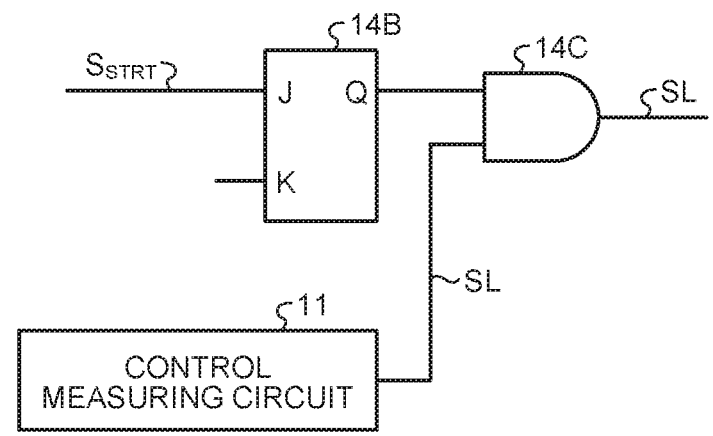
FIG. 13 is an explanatory diagram of a functional circuit for preventing a selection signal SL from becoming "1" (="H" level) when a power source is supplied.

FIG. 13 is an explanatory diagram of a functional circuit for preventing a selection signal SL from becoming "1" (="H" level) when the power source is supplied.

In the above circuit, it is assumed that an output of the JK flip-flop 14B never fails to become "0" (="L" level) after the power source is supplied. The selection signal SL is held at 0 (L) until a Start signal is inputted. By using the circuit together with the circuit illustrated in FIG. 12, there is no possibility that the SiAPDs 42 are brought into an ON state at a time until a start signal SSTRT is inputted after the power source is supplied.

Second Embodiment

In the first embodiment, the configuration is adopted where whether or not a Geiger current is generated by the incidence of light is digitally detected. The second embodiment, however, is an embodiment where an amount of Geiger current generated by the incidence of light is measured simply and in an analog manner, SPAD units 32 are effectively used as analog elements, and the SPAD units 32 are used as an infrared camera when the SPAD units 32 are not used for distance measurement.

Figure 14:
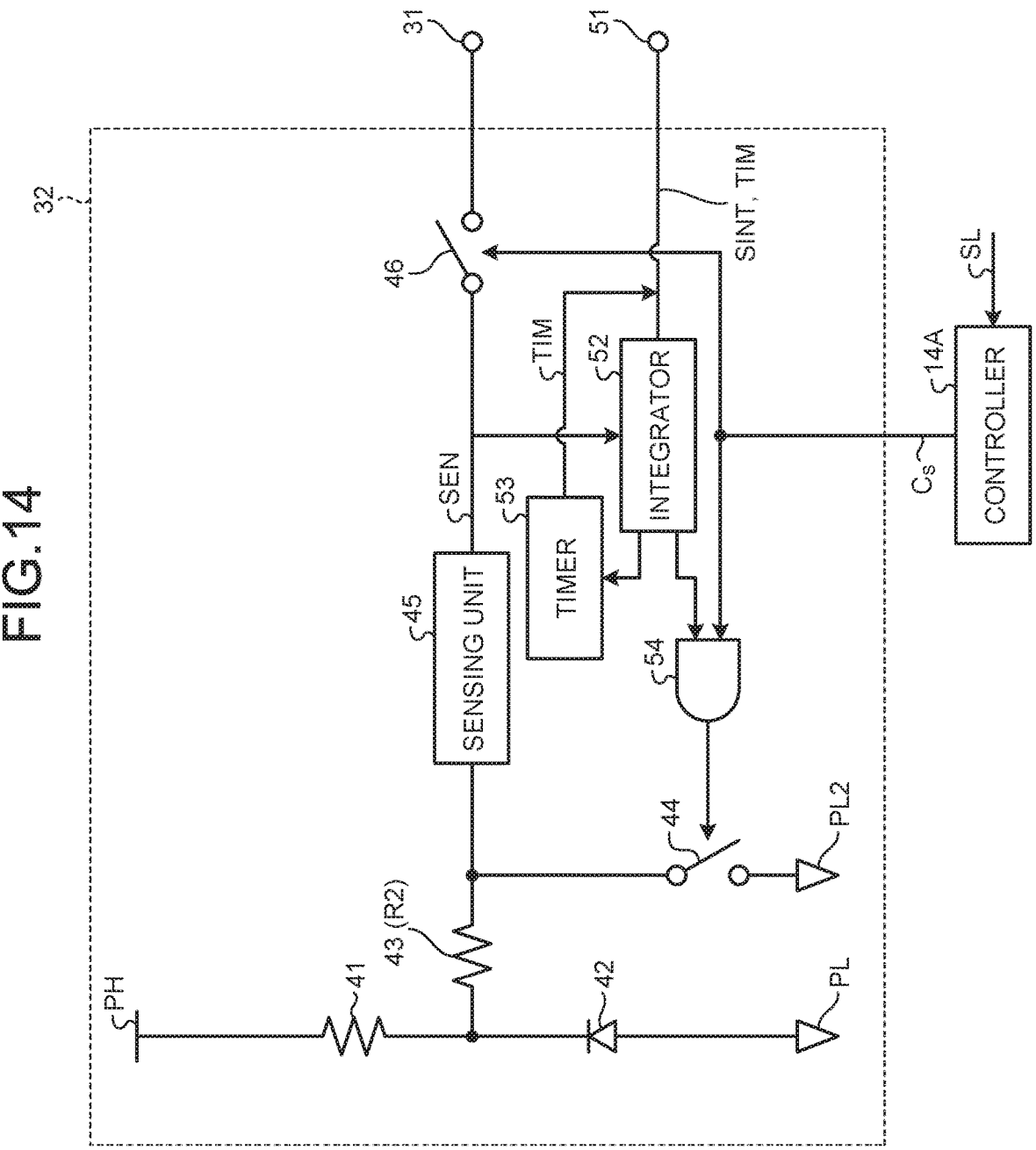
FIG. 14 is a view of a schematic configuration of a SPAD unit according to a second embodiment.

FIG. 14 is a schematic configuration diagram of a SPAD unit according to the second embodiment.

In FIG. 14, parts similar to the corresponding parts in the first embodiment illustrated in FIG. 10 are denoted by the same reference numerals, and the detailed description of the parts used in the first embodiment are used also in this embodiment.

The SPAD unit 32 of the second embodiment differs from the SPAD unit 32 of the first embodiment with respect to a point that the SPAD unit 32 includes: an integrator 52 which integrates detection signals SEN outputted from a sensing unit 45 and outputs an integral signal SINT via the output terminal 51; a timer 53 which counts a time from reset timing of the integrator 52 to a point of time that the integrator 52 reaches a maximum value (saturation) and outputs a count value TIM; and an AND circuit 54 which outputs a control signal for bringing an active quenching switch 44 into a closed state when the integrator 52 reaches the maximum value (saturation) and the SPAD unit 32 is in a non-distance measuring state.

Figure 15:
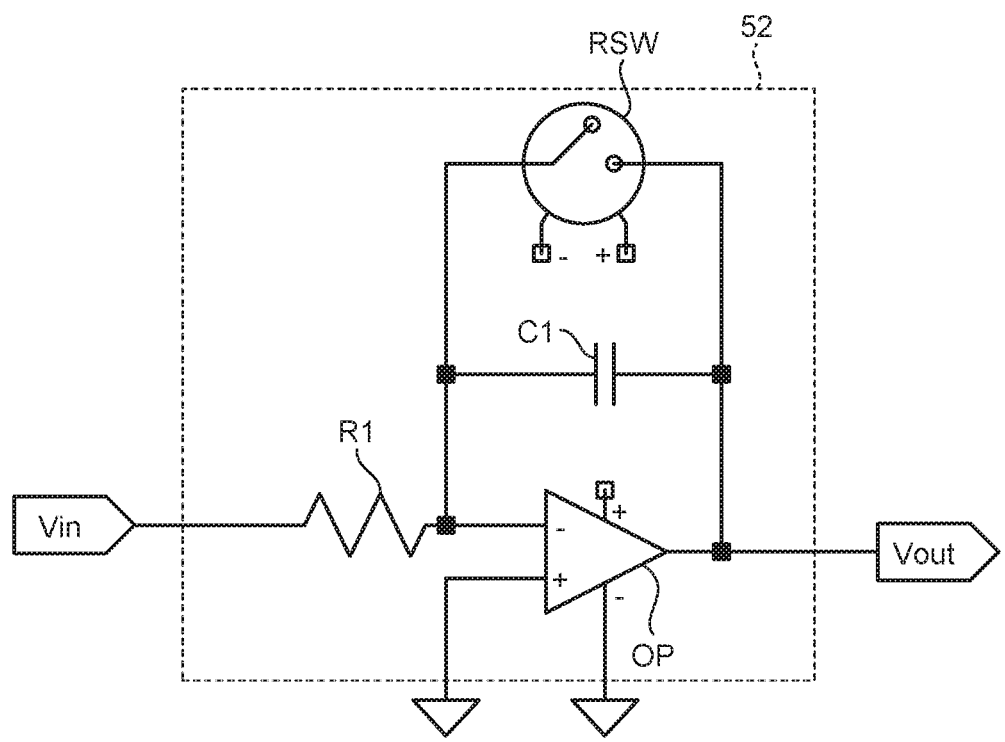
FIG. 15 is an explanatory diagram of a specific circuit example of an integrator.

FIG. 15 is an explanatory diagram of a specific circuit example of the integrator.

In the above configuration, as illustrated in FIG. 12, as the integrator 52, an integrator which uses a capacitor C1 and an operational amplifier OP and includes an input resistor R1 and a reset switch RSW is generally adopted.

However, a digital circuit such as a counter may be used as the integrator 52. In a case where resetting (recharging) of active quenching is performed by a current source, the integrator can be realized simply by connecting one capacitor to the current source.

The reason that the timer 53 is provided to the SPAD unit 32 will be described.

With respect to the integrator 52, since the number of SPAD units 32 is large, the number of integrators 52 becomes also large. Therefore, from the viewpoint of an installation area, a capacity of the integrator 52 cannot be increased so much that there is a possibility that a full capacity charge will be stored in the integrator 52 during a sensing period.

In view of the above, by counting a time until a capacity of the integrator 52 becomes full due to storing of a charge in the integrator 52 by the timer 53, an amount of a charge which is considered to be stored in the integrator 52 if the integrator 52 is operated during a sensing period is estimated so that an effective dynamic range can be increased.

As a result, it is possible to perform processing which prevents the occurrence of a saturated state similar to a so-called whiteout phenomenon that occurs in a normal digital camera, and an effective dynamic range of the SPAD unit 32 can be substantially expanded.

Accordingly, it is possible to use the SPAD units 32 which do not perform distance measurement, that is, the SPAD units 32 in a non-selected state as imaging pixels. On the other hand, it is possible to make a photodetector 14 which constitutes a two-dimensional array sensor function as an infrared camera by using an integral signal SINT or a count value TIM which is outputted via an output terminal 51 as an imaging signal.

Furthermore, in the case where neither a distance measuring operation nor an infrared camera operation is performed based on a control signal Cs and an output from the integrator 52, by bringing an active quenching switch 44 of an AND circuit 54 into an ON state (closed state), in the same manner as the first embodiment, with respect to the SPAD units 32 which do not perform outputting via an output terminal 31 after an integral function is used, a Geiger current can be eliminated and a through current which flows from a high-potential side power source PH to a low-potential side power source PL can be reduced. Accordingly, power consumption can be reduced without affecting the intended distance measurement.

Details of the manner of operation of the second embodiment will be described hereinafter.

FIG. 16 is an explanatory diagram of the manner of operation the second embodiment.

FIG. 16A is an explanatory diagram of the manner of operation when the integrator 52 is not saturated.

In this case, the active quenching switch 44 can be brought into an ON state (closed state) depending on the sensing unit 45. Assume that the selection switch 46 is in an ON state (closed state).

As a result, during a period from a point of time t1 to a point of time t2, when the SiAPD 42 receives a reflection light of an emitted pulsed laser beam PLT, a Geiger current flows. Accordingly, the sensing unit 45 outputs a detection signal SEN via an output terminal 31. As a result, the distance measurement is performed based on the difference (time) between a point of time that a pulsed laser beam PLT is emitted and a timing that a reflection light of the pulsed laser beam PLT is received.

The distance measurement is finished when the point of time t2 comes and hence, the selection switch 46 is brought into an OFF state (open state), the SPAD unit 32 is brought into an infrared camera operation mode, and the integrator 52 and the timer 53 are reset.

In an infrared camera operation mode, the SiAPD 42 receives an ambient light. When a Geiger current flows, the sensing unit 45 outputs a detection signal SEN to the integrator 52.

As a result, the integrator 52 performs an integration operation, and the timer 53 performs a time measuring operation.

Then, at a point of time t3 that a predetermined imaging time has elapsed, in a case where the integrator 52 has not yet reached a saturation state, the integrator 52 outputs an integral signal SINT having a value proportional to an amount of received light (intensity of an ambient light) via the output terminal 51.

Therefore, the control measurement circuit 11 in a subsequent stage constitutes an infrared imaged image based on the integral signal SINT.

Thereafter, at a timing that neither distance measurement nor infrared imaging is performed, the control measurement circuit 11 sets the control signal Cs to "0" via the controller 14A.

As a result, when an output of the AND circuit 54 becomes "0", the active quenching switch 44 is brought into an ON state (closed state).

Accordingly, it is possible to eliminate a through current flowing from a high-potential side power source PH to a low-potential side power source PL via the resistor 41, the current limiting resistor 43, and the active quenching switch 44 and hence, power consumption can be reduced.

FIG. 16B is an explanatory diagram of an operation of the integrator 52 when the integrator 52 reaches a saturated state.

Also in this case, the active quenching switch 44 can be brought into an ON state (closed state) depending on the sensing unit 45. Assume that the selection switch 46 is in an ON state (closed state).

During the period from the point of time t1 to the point of time t2, when the SiAPD 42 receives a reflection light of an emitted pulsed laser beam PLT, a Geiger current flows. Therefore, the sensing unit 45 outputs a detection signal SEN via the output terminal 31. As a result, the distance measurement is performed based on the difference (time) between a point of time that a pulsed laser beam PLT is emitted and a timing that a reflection light of the pulsed laser beam PLT is received.

The distance measurement is finished when the point of time t2 comes and hence, the selection switch 46 is brought into an OFF state (open state), the SPAD unit 32 is brought into an infrared camera operation mode, and the integrator 52 and the timer 53 are reset.

In an infrared camera operation mode, the SiAPD 42 receives an ambient light. When a Geiger current flows, the sensing unit 45 outputs a detection signal SEN to the integrator 52.

As a result, the integrator 52 performs an integration operation, and the timer 53 performs a time measuring operation.

In the case where the integrator 52 reaches a saturated state at the point of time t3 that a predetermined imaging time has not elapsed (the point of time that the predetermined imaging time has elapsed t4>t3), the integrator 52 notifies the timer 53 accordingly.

Further, the integrator 52 sets an output to the AND circuit 54 to "1" (corresponding to the output when the integrator 52 is saturated).

As a result, the timer 53 stops time measurement and holds a count value.

Then, at the point of time t4 that a predetermined imaging time has elapsed, the timer 53 outputs a count value TIM which corresponds to a time until the integrator 52 is saturated (=t3−t2) via the output terminal 51.

Accordingly, the control measurement circuit 11 in the subsequent stage constitutes an infrared imaged image based on the count value TIM.

Specifically, the control measurement circuit 11 constitutes an infrared imaged image by estimating the intensity of an ambient light by increasing the intensity of an ambient light corresponding to a saturation time of the integrator 52 by (t4−t2)/(t3−t2) times using the point of time t2, the point of time t3 and the point of time t4.

Thereafter, at a timing that neither distance measurement nor infrared imaging is performed, the control measurement circuit 11 sets the control signal Cs to "0" via the controller 14A.

As a result, when an output of the AND circuit 54 becomes "0", the active quenching switch 44 is brought into an ON state (closed state).

Accordingly, it is possible to eliminate a through current flowing from a high-potential side power source PH to a low-potential side power source PL via the resistor 41, the current limiting resistor 43, and the active quenching switch 44 and hence, power consumption can be reduced.

Therefore, according to the second embodiment, distance measurement and infrared image imaging can be performed exclusively.

Further, according to the second embodiment, in the same manner as the first embodiment, with respect to the SPAD unit 32 which do not perform outputting via the output terminals 31, a Geiger current is eliminated and hence, a through current flowing from the high-potential side power source PH to the low-potential side power source PL can be reduced or eliminated. Accordingly, the power consumption can be reduced without affecting the intended distance measurement and infrared image imaging.

Further, in the same manner as the modification of the first embodiment, a through-current prevention switch 48 is provided between the resistor 41 and the high-potential side power source PH and hence, a through current flowing from the high-potential side power source PH toward the low-potential side power source PL via the resistor 41, the current limiting resistor 43, and the active quenching switch 44 can be eliminated whereby the power consumption can be further reduced.

In the above description, two output terminals, that is, the output terminal 31 and the output terminal 51 are provided as output terminals. However, a changeover switch may be disposed in the SPAD unit 32 and one output terminal may be shared in common.

Third Embodiment

In the first embodiment described above, an output of the sensing unit 45 is directly outputted from the output terminal 31. The third embodiment is, however, an embodiment where an output selected from outputs of a sensing unit 45 is time-integrated in an output stage of the photodetector 14 after multi-valuing.

Figure 17:
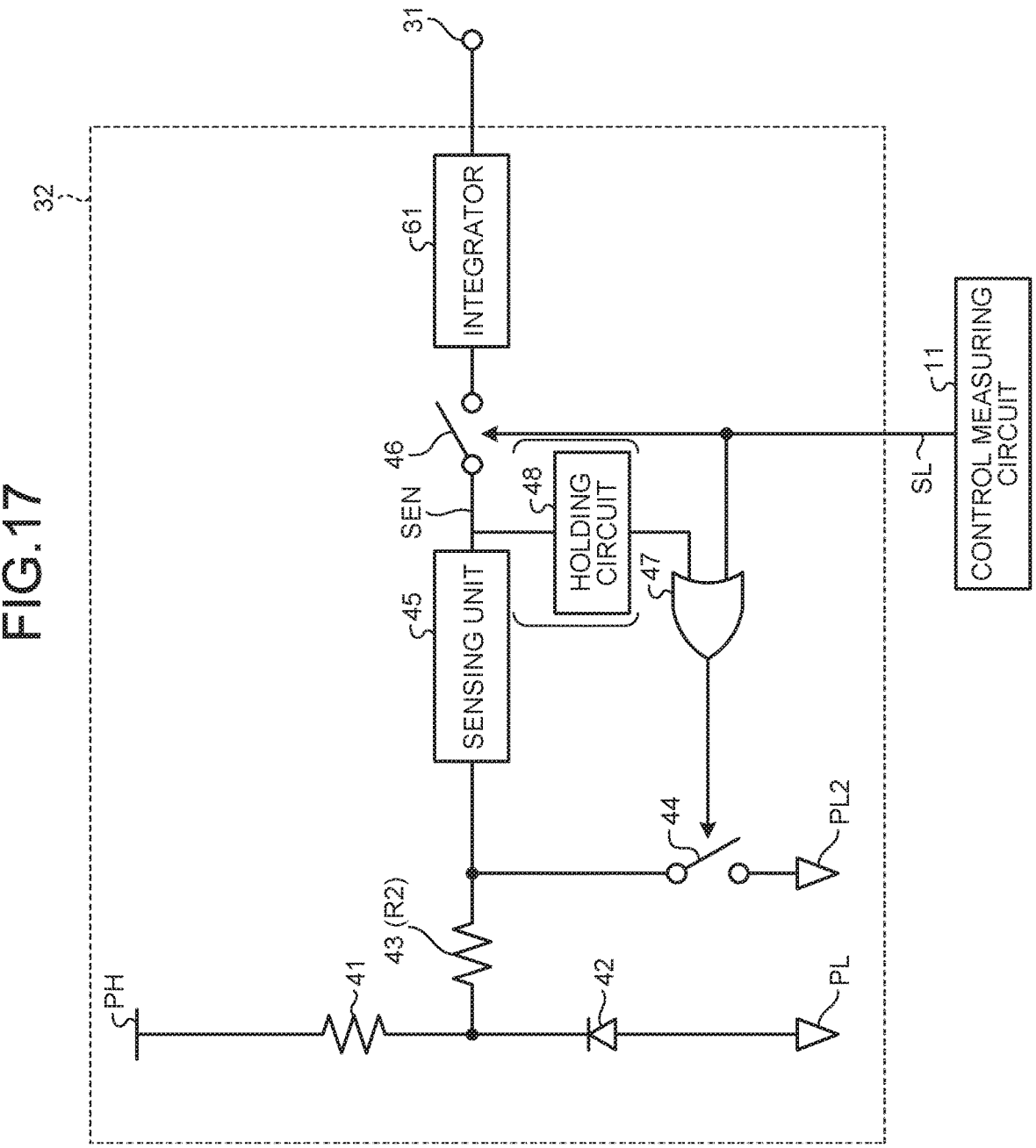
FIG. 17 is a schematic configuration diagram of a SPAD unit according to a third embodiment.

FIG. 17 is a diagram showing a schematic configuration of a SPAD unit according to the third embodiment.

The SPAD unit 32 of the third embodiment differs from the SPAD unit 32 of the first embodiment illustrated in FIG. 10 with respect to a point that an integrator 61 is provided between a selection switch 46 and an output terminal 31.

The reason that the integrator 61 is provided will be described hereinafter.

The SPAD unit 32 only outputs whether or not a Geiger current has flowed, and basically can only respond to binary values of "1" and "0".

In view of the above, in the third embodiment, an active quenching operation is performed by bringing an active quenching switch 44 into an ON state (closed state) plural times during a predetermined integration period. Since the active quenching SPAD can be operated at a high speed, the active quench SPAD can be operated plural times. However, it is possible to increase an operating speed of the active quench SPAD also by downsizing of the SPAD. By combining the operation of the active quenching SPAD plural times during a predetermined integration period and downsizing of the SPAD, it is possible to expect an operation of the SPAD at a higher speed of GHz level.

On the other hand, a photodetector 14 and an analog/digital circuit in a subsequent stage (included in a control measurement circuit 11) differ from each other in required process technique and the like. Accordingly, it is desirable that the photodetector 14 and the analog/digital circuit are realized as different integrated circuits. In this case, the output terminal 31 performs data transfer between chips and hence, impedance such as parasitic capacitance is increased. If a high-speed transfer at a GHz level is intended between chips as described above, data may not be transferred correctly due to problems on impedance.

The reason that the integrator 61 is provided is that the SPAD unit 32 is effectively realized as a multi-value (n-value) sensor by performing detection plural times (n times) so that the above problems are solved.

In this case, with the use of the integrator 61, reliable data transfer between the chips can be realized.

The reason is that although the SPAD unit 32 can perform a high-speed response operation by performing an active quenching operation, by transmitting a high-speed response result as a multi-value analog value at a low speed rather than directly transferring the high-speed response result, it is possible to realize stable data transfer.

That is, it is possible to easily perform inter-chip communication between the control measurement circuit 11 which is usually formed as a separate chip in a subsequent stage of the chip which constitutes the photodetector 14. Further, data can be directly processed by the A/D converter which the control measurement circuit 11 has.

As the integrator 61, a digital circuit using a counter and analog integration using a capacitor can be used.

Further, a low-pass filter can be used.

Figure 18:
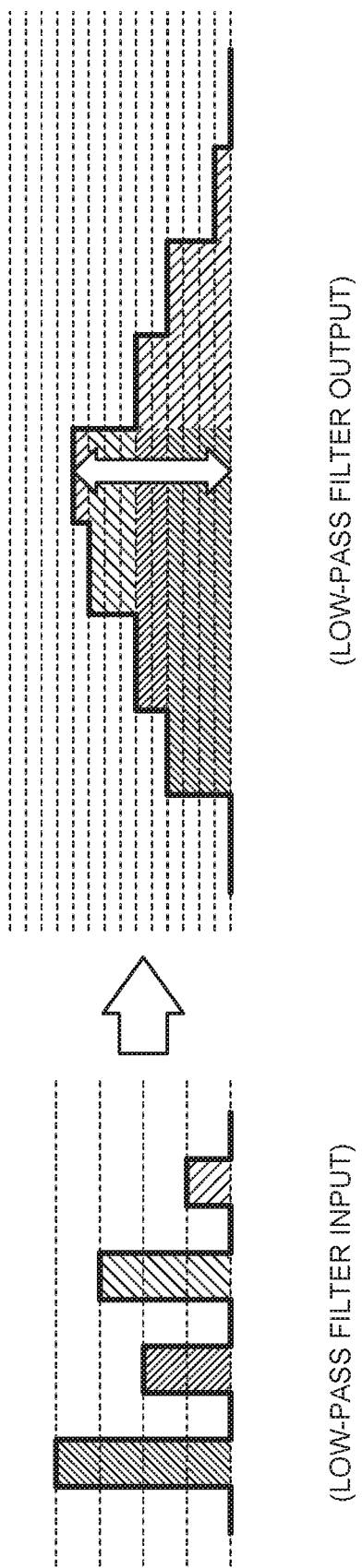
FIG. 18 is a schematic explanatory diagram of an example where a low-pass filter is applied.

FIG. 18 is a schematic explanatory diagram of an example where a low-pass filter is applied.

As schematically illustrated in FIG. 18, a peak value of a low-pass filter output (indicated by an arrow in the drawing) is proportional to an addition result of low-pass filter input values. The simplest low-pass filter is a filter where a resistor and capacitor are connected in series.

Further, the integrators 61 are included in an output stage and it is sufficient to provide the integrators 61 only for outputs selected from outputs of a sensing unit 45, it is sufficient to mount the integrators 61 the number of which corresponds to the number of output channels.

Further, the number of output channels is much smaller than the number of pixels in multiple pixels, especially in a two-dimensional sensor. Accordingly, by providing the integrators 61 in an output stage after a selection switch 46, area efficiency can be increased whereby a multi-valued function can be realized.

Furthermore, by providing the integrator 33 illustrated in FIG. 4 with the same function as the integrator 61, it is possible to cause a plurality of SPAD units 32 to function as multi-value sensors.

By adopting such a configuration, it is sufficient to provide the integrators the number of which is equal to the number of cell units 22 and hence, a multi-value sensor can be realized with a realistic circuit scale.

As described above, according to the third embodiment, it is possible to form a multi-value sensor without significantly changing the configuration of a conventional photodetector 14.

Also in this case, in the same manner as the first embodiment, with respect to the SPAD units 32 which do not perform outputting via output terminals 31, a Geiger current is eliminated and hence, a through current flowing from a high-potential side power source PH to a low-potential side power source PL can be reduced or eliminated. Accordingly, the power consumption can be reduced without affecting the intended distance measurement.

Further, in the same manner as the modification of the first embodiment, a through-current prevention switch 48 which constitutes a first switch is provided between a resistor 41 and the high-potential side power source PH. Accordingly, a through current flowing from the high-potential side power source PH toward the low-potential side power source PL via a resistor 41, a current limiting resistor 43, and an active quenching switch 44 can be eliminated and hence, the power consumption can be further reduced.

Fourth Embodiment

There may be a case where the SiAPD 42 receives a large amount of light and the return of a cathode of the SiAPD 42 to an initial state is not completed within a predetermined time. In this case, for example, in the circuit illustrated in FIG. 12, M3 is brought into an OFF state at a predetermined time and hence, it takes a long time before a carrier of APD 42 is released. Accordingly, there arises a drawback that the measurement cannot be performed at next measuring timing so that measurement performance is deteriorated.

Figure 19:
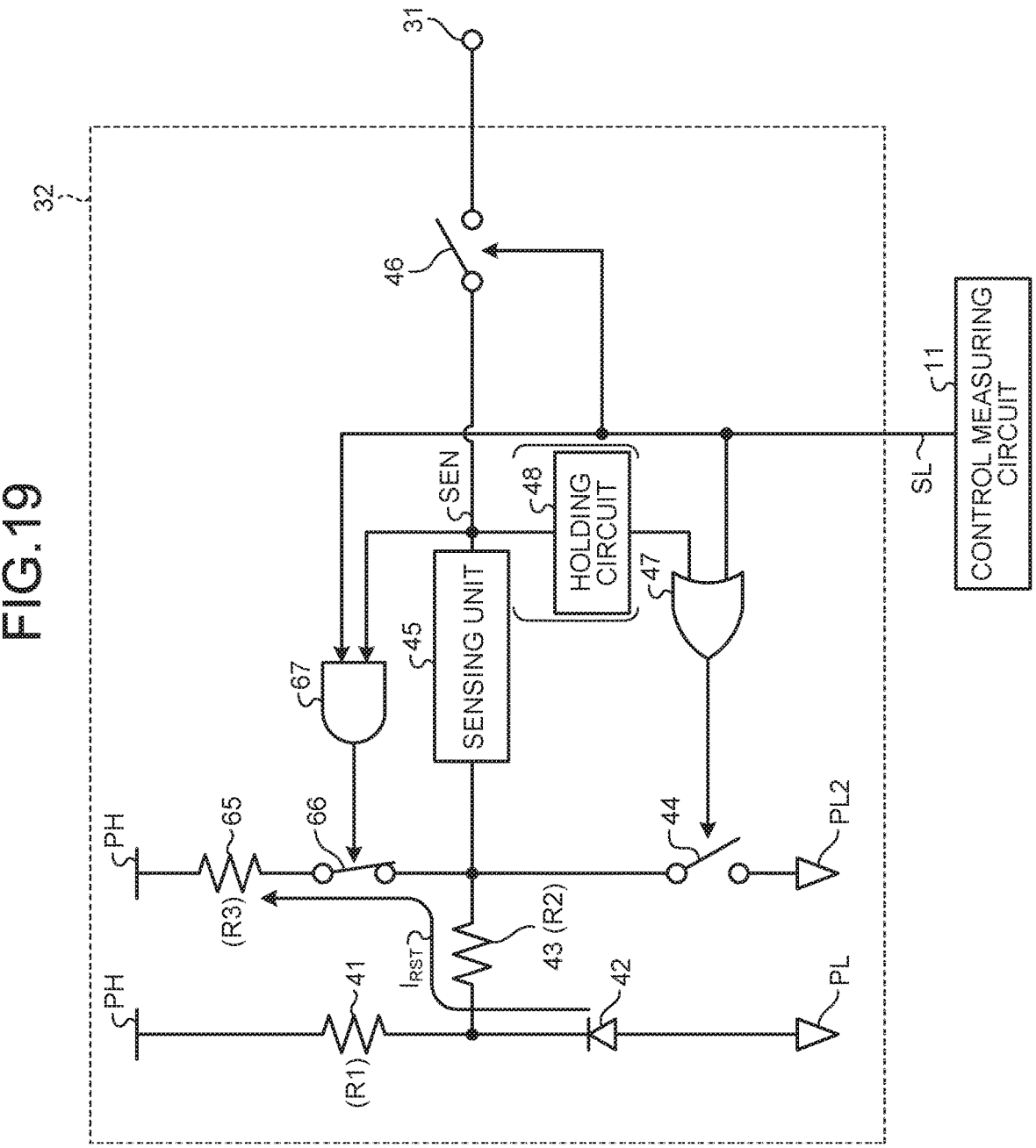
FIG. 19 is a schematic configuration diagram of a SPAD unit according to the fourth embodiment.

FIG. 19 is a schematic configuration diagram of a SPAD unit according to the fourth embodiment.

The SPAD unit 32 of the fourth embodiment differs from the SPAD unit 32 of the first embodiment illustrated in FIG. 5 with respect to following points. A current limiting resistor 65 and a cathode reset switch 66 which constitutes a second switch are connected in series between a high-potential side power source PH and a current limiting resistor 43. The SPAD unit 32 includes an AND circuit 67 which brings a cathode reset switch 66 into an ON state (closed state) in the case where an SiAPD 42 receives a large amount of light during an output period which is an ON state (closed state) of a selection switch 46 so that a sensing unit 45 detects that the return of the cathode of the SiAPD 42 is to an initial state is not completed within a predetermined time.

In this case, a resistance value R3 of the current limiting resistor 65 is set to be very small compared to a resistance value R1 of the resistor 41 (R3<<R1).

Next, the manner of operation of the fourth embodiment will be described.

Assume that, in an initial state of the SPAD unit 32, the cathode of the SiAPD 42 is in an initial state, and the cathode reset switch 66 is in an OFF state (open state).

In this state, when the SPAD unit 32 performs outputting via an output terminal 31, the selection switch 46 is brought into an ON state (closed state) and an active quenching switch 44 is brought into an OFF state (open state).

As a result, a predetermined reverse bias voltage generated by a high-potential side power source PH and a low-potential side power source PL is applied between an anode and the cathode of the SiAPD 42 and hence, a voltage is biased to a breakdown voltage (for example, −30 V) of an avalanche breakdown of the SiAPD 42.

Therefore, when a light enters the SiAPD 42 from a scanner and optical system unit 13, a Geiger phenomenon occurs, and a Geiger current caused by Geiger discharge flows.

Accordingly, the sensing unit 45 outputs a detection signal SEN indicating that the Geiger current is detected via the selection switch 46 and the output terminal 31.

Thereafter, since a control signal Cs is at "1", the sensing unit 45 is at "1" and hence, the active quenching switch 44 is held in an ON state for a predetermined time. Accordingly, a quenching operation is performed, and the SiAPD 42 is returned to an initial state at a high speed.

When a predetermined time elapses after the active quenching switch 44 is brought into an ON state, the active quenching switch 44 is brought into an OFF state (opened state).

In this case, in the case where an SiAPD 42 receives a large amount of light so that a sensing unit 45 detects that the return of the cathode of the SiAPD 42 to an initial state is not completed within a predetermined time, "1" is outputted to an AND circuit 67.

At this time, since a control signal Cs which brings the selection switch 46 into an ON state is also "1", the AND circuit 67 brings the cathode reset switch 66 into an ON state (closed state).

As a result, the cathode reset current $I_{RST}$ flows via the cathode reset switch 66 and the current limiting resistor 65 from the cathode of the SiAPD 42 toward the high-potential side power source PH.

As a result, the cathode of the SiAPD 42 returns to an initial state at a high speed.

As described above, according to the fourth embodiment, even when a large amount of light is irradiated to the SiAPD 42 which constitutes the cell unit 22, the distance measuring device is restored quickly and hence, measurement is performed again. FIG. 14 illustrates a functional implementation of the present embodiment. As a circuit, the SPAD unit 32 can be realized by a method such as inserting a NAND gate into an input of the gate of the transistor M3 illustrated in FIG. 12 and forming the other input by an MP.

Also in this case, in the same manner as the first embodiment, with respect to the SPAD units 32 which do not perform outputting via output terminals 31, a Geiger current is eliminated and hence, a switch 44 and a switch 66 are brought into an ON state (closed state) exclusively. Accordingly, a through current flowing from a high-potential side power source PH to a low-potential side power source PL can be reduced or eliminated and hence, the power consumption can be reduced without affecting the intended distance measurement.

While some embodiments of the invention have been described, these embodiments are merely examples, and are not intended to limit the scope of the invention. These novel embodiments may be implemented in various other forms, and various omissions, replacements, and modifications may be made without departing from the scope and spirit of the invention. These embodiments and the modifications are included in the scope and spirit of the invention, and are included in the invention described in the claims and their equivalents.

What is claimed is:

1. A photodetector comprising a plurality of channels each having a plurality of SPAD units, each SPAD unit having an avalanche photodiode, wherein the photodetector is capable of selecting outputting or non-outputting of the channels, the SPAD unit includes:

an active quenching circuit which performs active quenching of the avalanche photodiode;

a control circuit which brings the active quenching circuit, which corresponds to the channel where non-outputting is selected, into an operable state by a selection signal, and a selection-signal circuit which generates and outputs a new selection signal by taking a logical product of the selection signal and a signal that turns to a logical value of zero upon power-on.

2. The photodetector according to claim 1, further comprising a first switch connected to a high-potential side power source, wherein the control circuit brings the first switch into a non-conductive state in the SPAD unit where the non-outputting is selected.

3. The photodetector according to claim 1, further comprising a quenching resistor, wherein the avalanche photodiode is connected to the quenching resistor in series.

4. A photodetector according to claim 1, further comprising an integrated value outputting unit which performs time integration of outputs of the SPAD units where non-outputting is selected for a predetermined time, and outputs an integrated value or a time taken for the integrated value to reach an upper limit of the integrated value during a period where non-outputting is selected.

5. The photodetector according to claim 4, wherein the integrated value outputting unit includes:
an integrator that performs time integration of outputs of the SPAD units for predetermined time, and outputs an integrated value during the period where non-outputting is selected; and
a timer that counts a time taken for the integrated value to reach an upper limit of the timer, or a time corresponding to a maximum integration period.

6. The photodetector according to claim 5, wherein the integrator is formed as any one of a capacitor, a counter and a low-pass filter.

7. The photodetector according to claim 1, further comprising:
a current limiting resistor and a second switch connected in series between a cathode of the avalanche photodiode and a high-potential side power source, wherein
the control circuit determines whether or not a potential level of the cathode has reached a restored state during a predetermined restoring period, and brings the second switch into an ON state in a case where the cathode has not reached the restored state.

8. The photodetector according to claim 1, further comprising:
an integrator configured as a low-pass filter to perform, for a predetermined time, time integration of an output of the SPAD unit having non-outputting selected, and outputs an integrated value during the period where non-outputting is selected.

9. The photodetector according to claim 1, further comprising:
a first quenching switch transistor;
a reset switch transistor;
a second quenching switch transistor of the same type as the reset switch transistor;
a third quenching switch transistor; and
a delay circuit, wherein
a drain of the first quenching switch transistor and a drain of the reset switch transistor are connected to each other directly or via a resistance at a node,
a source of the second quenching switch transistor and a source of the reset switch transistor are connected in common to a power source directly or via a resistance,
a drain of the second quenching switch transistor is connected to a gate of the first quenching switch transistor via a node and a resistance,
a gate of the second quenching switch transistor is connected directly or via a resistance to a cathode or an anode of the avalanche photodiode and the drain of the reset switch transistor,
an input of the delay circuit is connected to the node directly or via a resistance and an output of the delay circuit is connected to a gate terminal of the reset switch transistor directly or via a resistance, and
the third quenching switch transistor is connected in parallel to the second quenching switch transistor directly or via a resistance, and receives the selection signal at a gate.

10. A distance measuring device comprising:
a measuring light irradiation unit that emits a measuring light to a distance measuring object;
a photodetector that detects the measuring light; and
a distance measuring unit that measures a distance from the distance measuring device to the distance measuring object based on a light emission timing of the measuring light emitted by the measuring light irradiation unit and a light reception timing of the photodetector, wherein
the photodetector includes a plurality of channels each having a plurality of SPAD units, and each of the plurality of SPAD units having an avalanche photodiode, the photodetector is capable of selecting outputting or non-outputting of the channels, and the SPAD unit has:
an active quenching circuit that performs active quenching of the avalanche photodiode;
a control circuit that brings the active quenching circuit which corresponds to the channels where the non-outputting is selected, into an operative state by a selection signal, and
a selection-signal circuit which generates and outputs a new selection signal by taking a logical product of the selection signal and a signal that turns to a logical value of zero upon power-on.

11. The distance measuring device according to claim 10, wherein the photodetector has a first switch connected to a high-potential side power source, and
the control circuit brings the first switch into a non-conductive state in the SPAD unit where the non-outputting is selected.

12. The distance measuring device according to claim 10, wherein the photodetector has a quenching resistor, and the avalanche photodiode is connected to the quenching resistor in series.

13. The distance measuring device according to claim 10, wherein the photodetector includes an integrated value outputting unit that performs time integration of outputs of the SPAD units where non-outputting is selected for a predetermined time, and outputs an integrated value or a time taken for the integrated value to reach an upper limit of the integrated value during a period where non-outputting is selected.

14. The distance measuring device according to claim 13, wherein the integrated value outputting unit includes:
an integrator that performs time integration of outputs of the SPAD units for a predetermined time, and outputs an integrated value during the period where non-outputting is selected; and
a timer that counts a time taken for the integrated value to reach an upper limit of the timer, or a time corresponding to a maximum integration period.

15. The distance measuring device according to claim 14, wherein the integrator is formed as a capacitor, a counter or a low-pass filter.

16. The distance measuring device according to claim 10, wherein
the photodetector includes a current limiting resistor and a second switch which are connected in series between a cathode of the avalanche photodiode and a high-potential side power source, and the control circuit determines whether or not a potential level of the cathode has reached a restored state during a predetermined restoring period, and when the potential level of the cathode has not reached the restored state, brings the second switch into an ON state.

17. The distance measuring device according to claim 10, wherein the photodetector further comprises:
   an integrator configured as a low-pass filter to perform, for a predetermined time, time integration of an output of the SPAD unit having non-outputting selected, and outputs an integrated value during the period where non-outputting is selected.

18. The distance measuring device according to claim 10, wherein the photodetector further comprises:
   a first quenching switch transistor;
   a reset switch transistor;
   a second quenching switch transistor of the same type as the reset switch transistor;
   a third quenching switch transistor; and
   a delay circuit, wherein
   a drain of the first quenching switch transistor and a drain of the reset switch transistor are connected to each other directly or via a resistance at a node,
   a source of the second quenching switch transistor and a source of the reset switch transistor are connected in common to a power source directly or via a resistance,
   a drain of the second quenching switch transistor is connected to a gate of the first quenching switch transistor via a node and a resistance,
   a gate of the second quenching switch transistor is connected directly or via a resistance to a cathode or an anode of the avalanche photodiode and the drain of the reset switch transistor,
   an input of the delay circuit is connected to the node directly or via a resistance and an output of the delay circuit is connected to a gate terminal of the reset switch transistor directly or via a resistance, and
   the third quenching switch transistor is connected in parallel to the second quenching switch transistor directly or via a resistance, and receives the selection signal at a gate.

* * * * *